Figure 1:
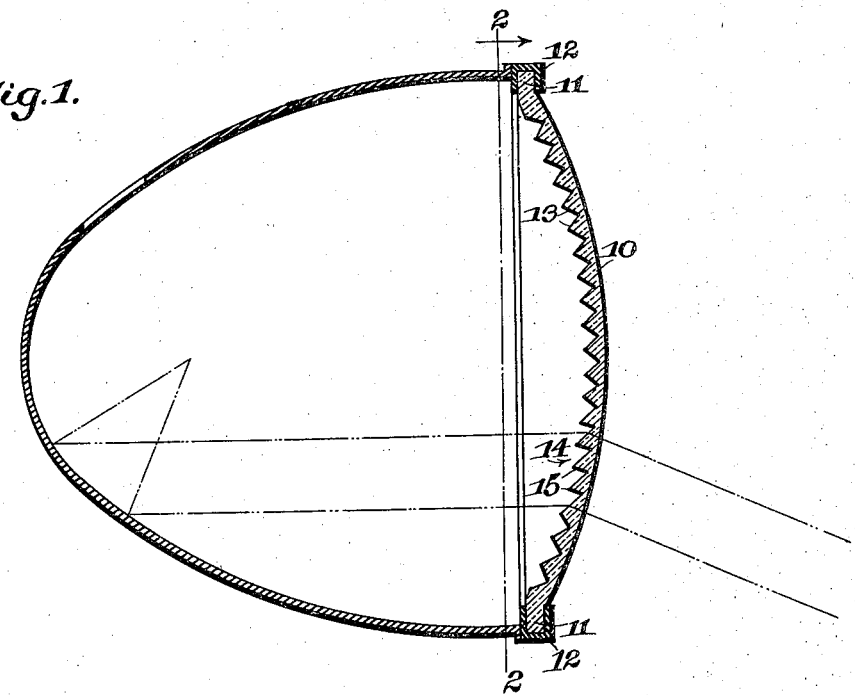

C. W. WAGGONER.
HEADLIGHT LENS.
APPLICATION FILED AUG. 18, 1917.

1,245,836.

Patented Nov. 6, 1917.

Inventor
Chauncey W. Waggoner
By Wm. S. Hodges
Attorney

UNITED STATES PATENT OFFICE.

CHAUNCEY W. WAGGONER, OF MORGANTOWN, WEST VIRGINIA, ASSIGNOR TO WALTER A. JONES, OF MORGANTOWN, WEST VIRGINIA.

HEADLIGHT-LENS.

1,245,836.  Specification of Letters Patent.  Patented Nov. 6, 1917.

Application filed August 18, 1917. Serial No. 186,890.

*To all whom it may concern:*

Be it known that I, CHAUNCEY W. WAGGONER, a citizen of the United States, residing at Morgantown, in the county of Monongalia and State of West Virginia, have invented new and useful Improvements in Headlight-Lenses, of which the following is a specification.

This invention is a lens for use on headlights of automobiles, railway cars, locomotives and the like.

The high power headlights of the present day, and particularly those of the type employed on automobiles, are highly objectionable under many circumstances, because of the concentrated glare of the light rays projected therefrom. So many accidents have been attributed to the temporary blinding of automobile operators, by the intense glare of the headlights of other vehicles, that in most communities, as a precaution of safety in the management of traffic, municipal regulations have been enacted, requiring that headlights employing high power lamps, be provided with dimmers, or other means to destroy the glare. One of the objects of the invention is to overcome the objections to the high power headlights now in general use, by providing a lens having means whereby the concentrated rays of light from the source of illumination, will be so broken up or distorted, as to destroy the glare from the most powerful lamp and yet permit the full illuminating power of the lamp to pass through the lens and be utilized for the lighting up of a maximum area ahead of the vehicle, thus giving the operator the full benefit of the lamp. A further object is to provide means whereby a small beam of light may be permitted to penetrate the darkness at a somewhat greater distance than the remaining rays of light, and yet to prevent an objectionable glare from such beam of light, when the lamp is not, or cannot be placed exactly in focus with the reflector.

Another well understood objection to the high power headlights now in general use is that by means thereof the light rays are concentrated in a line extending straight ahead of the vehicle, thereby placing the road immediately to either side of the vehicle, in deep shadow, and by reason of this condition, operators have been known to drive their machines into ditches at either side of a road, because it is impossible to distinguish them in time.

A further object of the invention is to overcome the last mentioned objection by providing a headlight lens by means of which the portions of a road immediately on either side of the vehicle, may be brilliantly illuminated.

The invention will be hereinafter fully set forth and particularly pointed out in the claims.

In the accompanying drawings:—

Figure 2:
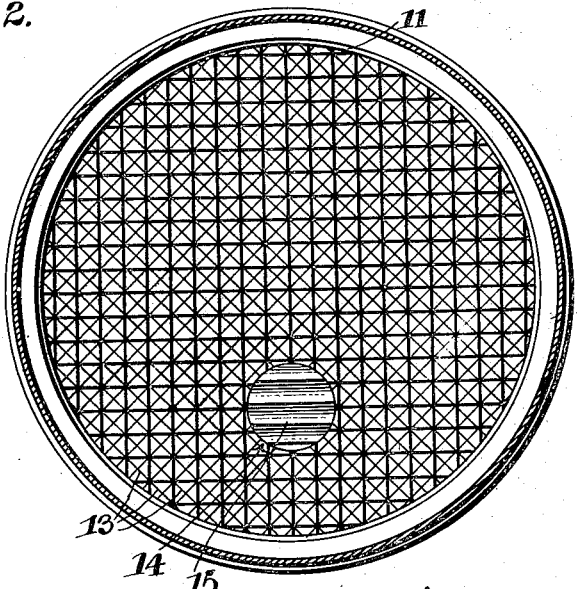

Figure 1 is a sectional view of a conventional form of a headlight casing, with the invention applied thereto. Fig. 2 is a front elevation thereof.

Referring to the drawings, 10 designates a body of transparent material, preferably glass, of general concavo-convex form in cross section, provided with a flat rim 11, the periphery of which is contoured to fit within the casing 12. The concave face of the body 10 is covered with pyramidal protuberances 13, preferably produced by a plurality of rectangular equilateral prisms, touching at their bases, and formed in any suitable manner as by cutting, pressing, or in any other manner known in the art of glass manufacture. Located at any suitable point, preferably below the center of the body 10 is a circular "spot" 14, having its inner face covered by a plurality of horizontally disposed triangular prisms 15, the bottom faces of which are horizontal and parallel.

In operation, the most powerful lamps may be used in connection with the lens above described, without obtaining any of the objectional glare common to the present type of headlight. It will be understood that the rays of light passing through the lens, are caught by the numerous small prisms 13, and by them diverted or distorted, so to absolutely prevent the concentration of the rays, which causes the well known glare, and although the glare is destroyed, the full power of the light rays passes through the lens and serves to illuminate the area immediately ahead of the lamp, with great brilliancy. The "spot" portion 14 of the lens will permit of the passage of a small beam of light which will penetrate the darkness somewhat farther than the light passing through the prisms, and such beams of light directed downwardly by prisms 15, so as to avoid the blinding effect that would be produced by a concentration of all of the light rays of the lamp, when the lamp is not, or cannot be placed in focus with reflector. By making the body of concavo-convex form in cross section, the prismatic bodies also serve to direct the rays of light laterally, with respect to the lamp, thereby permitting brilliant illumination of a road immediately to either side of the vehicle by which the lamp is carried, thereby rendering the operation of the vehicle perfectly safe, even during the darkest night.

Having thus explained the nature of the invention and described an operative manner of constructing and using the same, although without attempting to set forth all of the forms in which it may be made, or all of the forms of its use, what is claimed is:—

1. An improved headlight lens comprising a transparent body shaped to engage a reflector and having one face covered with pyramidal equilateral prisms, the prism covered face being interrupted by a circular " spot " provided with horizontally disposed triangular prisms extending across the same.

2. An improved headlight lens comprising a transparent body shaped to engage a reflector and having one face covered with pyramidal equilateral prisms, the prism covered face being interrupted by a circular " spot " provided with horizontally disposed triangular prisms extending across the same, said triangular prisms being shaped to downwardly deflect the light rays passing therethrough.

3. An improved headlight lens comprising a transparent body shaped to engage a reflector and having one face covered with pyramidal equilateral prisms, the prism covered face being interrupted by a circular " spot " provided with horizontally disposed triangular prisms extending across the same, the bottom faces of said triangular prisms being horizontal and parallel.

In testimony whereof I have hereunto set my hand in presence of two subscribing witnesses.

CHAUNCEY W. WAGGONER.

Witnesses:
NELSON L. OTT,
WM. M. SHEAVLY.